US011539925B2

(12) United States Patent
Otsuki

(10) Patent No.: US 11,539,925 B2
(45) Date of Patent: Dec. 27, 2022

(54) PROJECTOR WITH OPERATION MEMBER FOR ADJUSTING A POSITION OF A LENS

(71) Applicant: SEIKO EPSON CORPORATION, Tokyo (JP)

(72) Inventor: Nobuyuki Otsuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 17/148,617

(22) Filed: Jan. 14, 2021

(65) Prior Publication Data

US 2021/0218941 A1 Jul. 15, 2021

(30) Foreign Application Priority Data

Jan. 14, 2020 (JP) .............................. JP2020-003443

(51) Int. Cl.
*H04N 9/31* (2006.01)
*G02B 27/09* (2006.01)
*G03B 21/14* (2006.01)
*G03B 21/16* (2006.01)

(52) U.S. Cl.
CPC ....... *H04N 9/3152* (2013.01); *G02B 27/0955* (2013.01); *G03B 21/142* (2013.01); *G03B 21/145* (2013.01); *G03B 21/16* (2013.01)

(58) Field of Classification Search
CPC ........ G03B 21/00; G03B 21/28; G03B 21/53; G03B 21/142; G03B 21/145; G02B 27/18; G02B 27/095; G02B 27/0955; G02B 27/0961; G02B 27/0977; H04N 9/31; H04N 9/317; H04N 9/3141; H04N 9/3152; H04N 9/3155
See application file for complete search history.

(56) References Cited

U.S. PATENT DOCUMENTS

| 7,357,518 B2* | 4/2008 | Iinuma | H04N 9/317 |
| | | | 359/813 |
| 2011/0292355 A1* | 12/2011 | Amano | G02B 13/0095 |
| | | | 359/811 |
| 2012/0307214 A1* | 12/2012 | Koyama | G03B 21/28 |
| | | | 353/98 |

(Continued)

FOREIGN PATENT DOCUMENTS

| JP | 2004-012973 | 1/2004 |
| JP | 2008-250048 | 10/2008 |

(Continued)

*Primary Examiner* — Sultan Chowdhury
(74) *Attorney, Agent, or Firm* — Dority & Manning, P.A.

(57) ABSTRACT

A projector includes a light projector and a position adjuster. The light projector includes a holder holding a plurality of lenses and a movable frame element provided to be pivotable around the optical axis of the plurality of lenses and that pivots to move a target lens out of the plurality of lenses along the optical axis. The position adjuster includes an arm member connected to the movable frame element that pivots along with the movable frame element, an operation member provided to be pivotable around a pivotal axis substantially parallel to the optical axis and pivots when an end portion of the operation member opposite the arm member is moved, and a linkage mechanism that links the arm member to the operation member and causes the arm member to pivot in response to the pivotal motion of the operation member.

8 Claims, 13 Drawing Sheets

(56) References Cited

U.S. PATENT DOCUMENTS

| | | | | |
|---|---|---|---|---|
| 2013/0003025 A1* | 1/2013 | Cheng | ............... | G03B 21/16 |
| | | | | 353/57 |
| 2013/0038524 A1* | 2/2013 | Otsuki | ............... | G06F 3/03542 |
| | | | | 348/E5.09 |
| 2013/0044298 A1* | 2/2013 | Jung | ............... | G03B 21/142 |
| | | | | 353/101 |
| 2013/0300951 A1* | 11/2013 | Hayashi | ............... | H04N 9/3197 |
| | | | | 349/8 |
| 2019/0219906 A1 | 7/2019 | Kase | | |

FOREIGN PATENT DOCUMENTS

| | | |
|---|---|---|
| JP | 2011-002602 | 1/2011 |
| JP | 2019-124819 | 7/2019 |

* cited by examiner

PROJECTOR WITH OPERATION MEMBER FOR ADJUSTING A POSITION OF A LENS

The present application is based on, and claims priority from JP Application Serial Number 2020-003443, filed Jan. 14, 2020, the disclosure of which is hereby incorporated by reference herein in its entirety.

BACKGROUND

1. Technical Field

The present disclosure relates to a projector.

2. Related Art

There has been a known projector including a light source, a light modulator that modulates light outputted from the light source, and a projection section that projects the light modulated by the light modulator. As a projector of this type, there has been a known projector capable of adjusting the focus state of a projected image by moving a focusing lens out of a plurality of lenses provided in the projection section along the optical axis of the plurality of lenses (for example, see JP-A-2011-2602 and JP-A-2004-12973).

The projector described in JP-A-2011-2602 includes a focus adjuster including a movable frame element, a rotation lever, and an operation knob. The movable frame element is so held by a support element of the projection section as to be rotatable around the optical axis of the lenses of the projection section. The rotation lever is linked to the movable frame element and the operation knob and rotates along with the movable frame element. The operation knob is so provided as to be movable linearly along a laid rail. When the operation knob is moved externally via an operation opening by a person outside the projector, the movable frame element is rotated along with the rotation level linked to the operation knob. The lenses of the projection section are thus moved along the optical axis of the lenses to adjust the focus state of the projected image.

The projector described in JP-A-2004-12973 includes a focusing ring that moves an intended lens that forms the projection lens and an annular operation member for focusing that engages with the focusing ring. The operation for focusing member is rotatably supported by a support base. When the operation member for focusing is rotated via an operation window by a person outside the projector, the focusing ring is rotated to move the intended lens. The focus state of the projected image is thus adjusted.

In the projector described in JP-A-2011-2602, however, an increase in the distance between the operation opening and the rotation level increases the size of the operation knob. In this case, the amount of displacement of an end portion of the operation knob that is the end portion facing the rotation lever due to the play between the laid rail and the operation knob increases, resulting in a problem of a difficulty in operation of adjusting the position of the lens and another problem of an increase in resistance of the movement of the operation knob along the laid rail.

On the other hand, in the projector described in JP-A-2004-12973, an increase in the distance between the operation window and each ring requires an increase in the size of each operation member. In this case, the size of an outer enclosure that accommodates the operation members increases, resulting in a problem of an increase in the size of the projector.

It has therefore been desired to provide a configuration that at least allows improvement in the operability of the lens position adjustment or suppression of the increase in the size of the projector.

SUMMARY

A projector according to an aspect of the present disclosure includes a projection section that projects image forming light, a position adjuster, and an enclosure that accommodates the projection section and the position adjuster. The projection section includes a plurality of lenses, a holder that holds the plurality of lenses, and a movable frame element so provided around the holder as to be pivotable around an optical axis of the plurality of lenses and caused to pivot to move a movement target lens out of the plurality of lenses along the optical axis. The position adjuster includes an arm member connected to the movable frame element and caused to pivot along with the movable frame element, an operation member so provided in the enclosure as to be pivotable around a pivotal axis substantially parallel to the optical axis and caused to pivot when an end portion of the operation member that is an end portion opposite the arm member is moved in a direction perpendicular to the optical axis, and a linkage mechanism that links the arm member to the operation member and causes the arm member to pivot in response to the pivotal motion of the operation member. The pivotal axis of the operation member is closer to an end portion of the operation member that is the end portion opposite the arm member than to an end portion of the operation member that is an end portion facing the arm member.

DESCRIPTION OF EXEMPLARY EMBODIMENTS

An embodiment of the present disclosure will be described below with reference to the drawings.

Schematic Configuration of Projector

Figure 1:
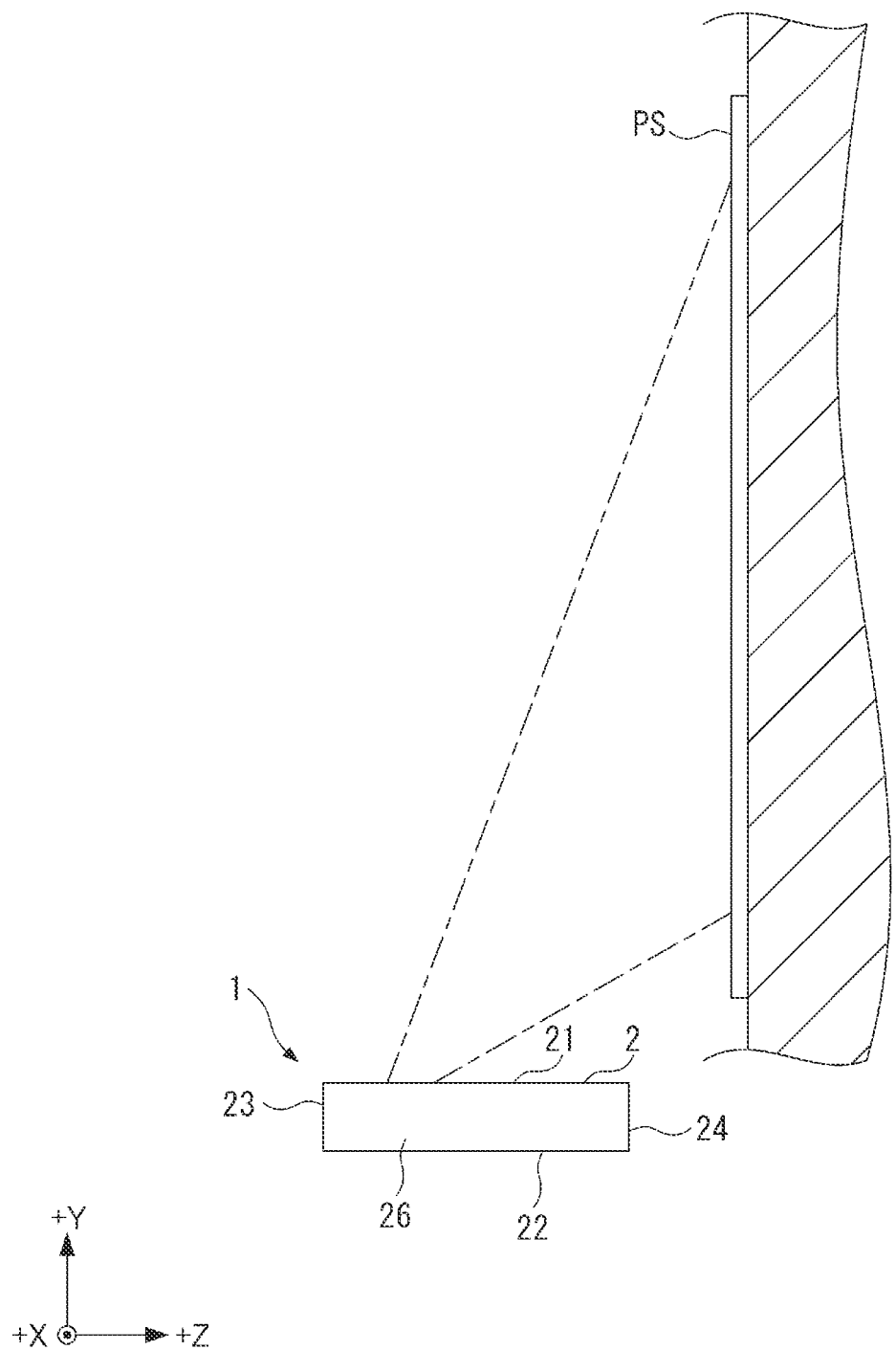
FIG. 1 shows a projector in use according to an embodiment viewed from the side facing one side of the projector.

FIG. 1 shows a projector 1 is use according to the present embodiment viewed from the side facing one side of the projector 1.

The projector 1 is an image display apparatus that forms an image according to image information and projects the formed image on a projection receiving surface PS, such as a screen, as shown in FIG. 1. For example, the projector 1 is placed on a placement surface, such as a floor and a stand, or suspended from a ceiling or a wall when used.

Exterior Appearance Configuration of Projector

Figure 2:
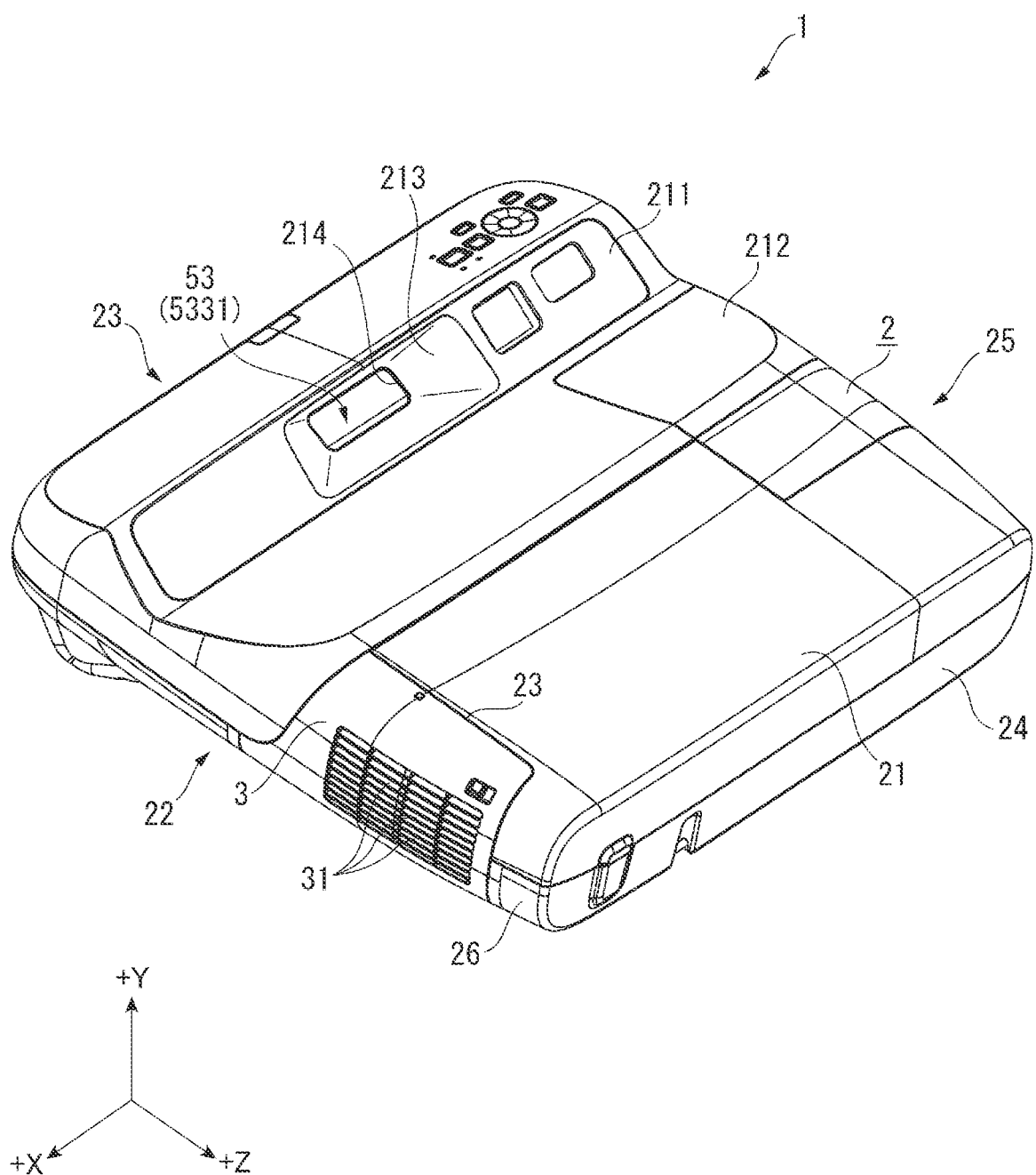
FIG. 2 is a perspective view showing the exterior appearance of the projector according to the embodiment.

FIG. 2 is a perspective view showing the exterior appearance of the projector 1.

The projector 1 includes an enclosure 2, which forms the exterior of the projector 1, and a cover member 3, which is attached to the enclosure 2, as shown in FIG. 2.

Configuration of Enclosure

The enclosure 2 includes a top surface section 21, a bottom surface section 22, a front surface section 23, a rear surface section 24, a left side surface section 25, and a right surface section 26 and has a substantially box-like shape.

The top surface section 21 and the bottom surface section 22 are surfaces of the enclosure 2 that face away from each other. In the present embodiment, the top surface section 21 is a surface that intersects the direction in which an operation section 623 of an operation member 62, which will be described later, is moved, and the top surface section 21 corresponds to a first surface section.

The front surface section 23, the rear surface section 24, the left side surface section 25, and the right side surface section 26 are side surface sections that intersect the top surface section 21 and the bottom surface section 22. The front surface section 23 and the rear surface section 24 are surfaces facing away from each other, and the left side surface section 25 and the right side surface section 26 are surfaces facing away from each other. In the present embodiment, the right side surface section 26 corresponds to a second surface section that intersects the top surface section 21, which is the first surface section.

In the state shown in FIG. 1, in which the projector 1 is in use, the projector 1 is so disposed that the top surface section 21 is oriented upward and the rear surface section 24 faces the projection receiving surface PS.

In the following description, three directions that intersect one another are called directions +X, +Y and +Z. In the present embodiment, the three directions are defined as follows: The direction +X is the direction from the left side surface section 25 toward the right side surface section 26; the direction +Y is the direction from the bottom surface section 22 toward the top surface section 21; and the direction +Z is the direction from the front surface section 23 toward the rear surface section 24. That is, the directions +X, +Y and +Z are perpendicular to one another in the present embodiment. Although not shown, the direction opposite the direction +X is called a direction −X, the direction opposite the direction +Y is called a direction −Y, and the direction opposite the direction +Z is called a direction −Z.

The directions +Y and −Y are the directions in which the operation section 623 of the operation member 62, which will be described later, is moved and correspond to directions perpendicular to an optical axis Ax of a projection section 53, which will be described later.

The top surface section 21 includes a first inclining section 211, a second inclining section 212, a recessed section 213, and an image opening 214.

The first inclining section 211 and the second inclining section 212 face each other in the direction +Z. The first inclining section 211 is located at the side facing the direction −Z, which is the side facing the front surface section 23, and the second inclining section 212 is located at the side facing the direction +Z, which is the side facing the rear section 24.

In detail, the first inclining section 211 starts from a portion of the top surface section 21 that is a portion facing the front surface section 23 and inclines in the direction −Y, which is the direction toward the bottom surface section 22, by an amount that increases with distance to the direction +Z, which is the side facing the rear surface section 24.

The second inclining section 212 starts from an end of the first inclining section 211 that is the end facing the direction +Z and inclines in the direction +Y, which is the direction away from the bottom surface section 22, by an amount that increases with distance to the direction +Z.

The first inclining section 211 is provided with the recessed section 213. The recessed section 213 is so formed as to incline in the direction −Z and in the direction −Y.

The image opening 214 is an opening via which an image outputted from the projection section 53 passes. The image opening 214 is provided at the bottom of the recessed section 213 in the position corresponding to an opening 5331 of the projection section 53, which will be described later. The reason why the second inclining section 212 is so provided as to be continuous with the first inclining section 211, where the image opening 214 is located, is to suppress blockage of the light outputted via the image opening 214 due to the constituent portions of the top surface section 21.

Figure 3:
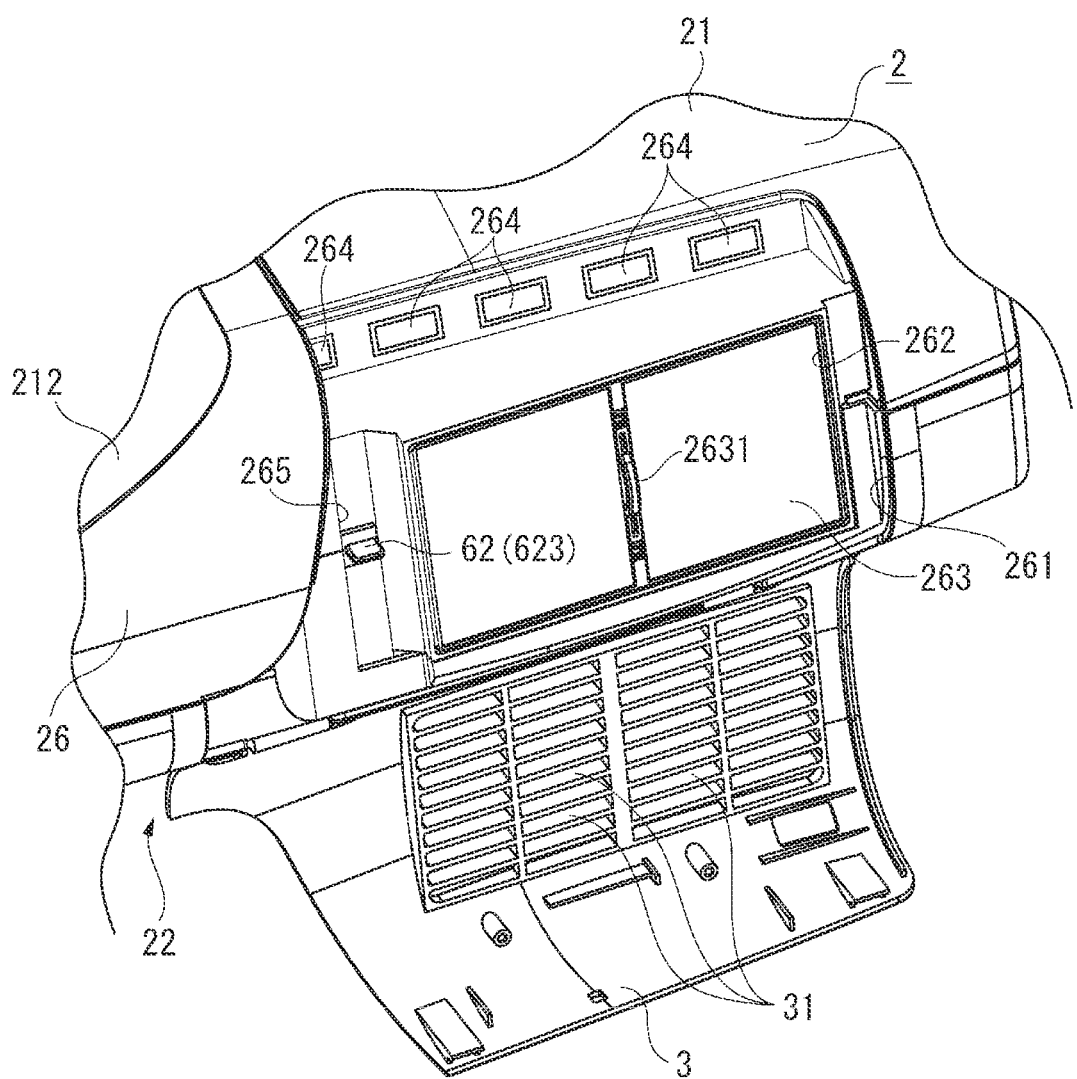
FIG. 3 is an enlarged view of part of an enclosure in the embodiment.

FIG. 3 is an enlarged perspective view showing part of the enclosure 2. In detail, FIG. 3 is an enlarged perspective view showing part of the right side surface section 26 exposed via the cover member 3 having pivoted.

The right side surface section 26 has an opening 261, an introduction port 262, a filter 263, a plurality of operation buttons 264, and an operation opening 265, as shown in FIG. 3.

The opening 261 is so formed as to have a substantially oblong shape elongated in the direction +Z when viewed from the direction +X. The opening 261 is recessed in the direction −X, which is the direction toward the left side surface section 25.

The introduction port 262 is provided in the opening 261. The introduction port 262 introduces the air outside the enclosure 2 as a cooling gas into the interior of the enclosure 2.

The filter 263 is provided in the introduction port 262. The filter 263 traps dust contained in the air that passes through the introduction port 262 and is introduced into the interior of the enclosure 2. The filter 263 includes a grasper 2631, which is located at the center of the filter 263 in the direction +Z and grasped by a user when the user removes the filter 263.

The plurality of operation buttons 264 are arranged along the direction +Z in the opening 261 at one side of the introduction port 262 that is the side facing the direction +Y, which is the side facing the top surface section 21. When any of the plurality of operation buttons 264 is pressed by the user, a predetermined operation signal is outputted to a controller that is not shown but controls the action of the projector 1.

The operation opening 265 is located in the opening 261 at one side of the introduction port 262 that is the side facing the direction −Z, which is the side facing the front surface section 23. The operation opening 265 is so formed as to have a substantially rectangular shape elongated in the direction +Y. The operation opening 265 exposes the operation section 623 of the operation member 62, which forms a position adjuster 6, which will be described later.

Configuration of Cover Member

The cover member 3 is provided in correspondence with the opening 261 and formed of a substantially L-letter shaped plate element that extends from part of the top surface section 21 to part of the right side surface section 26.

The cover member 3 is so supported by the enclosure 2 as to be pivotable in the directions ±Y. When the cover member 3 is caused to pivot in the direction +Y, the cover member 3 closes the opening 261, and when the cover member 3 is caused to pivot in the direction −Y, the opening 261 is opened. That is, the cover member 3, when it is caused to pivot in the direction +Y, covers the introduction port 262, the filter 263, the operation buttons 264, the operation opening 265, and the operation section 623. When the cover member 3 is caused to pivot in the direction −Y, the introduction port 262, the filter 263, the operation buttons 264, the operation opening 265, and the operation section 623 are exposed.

The cover member 3 has a plurality of slits 31 in positions corresponding to the introduction port 262. The outside the enclosure 2 passes through the plurality of slits 31 and is introduced as the cooling gas into the interior of the enclosure 2 via the introduction port 262.

Interior Configuration of Projector

Figure 4:
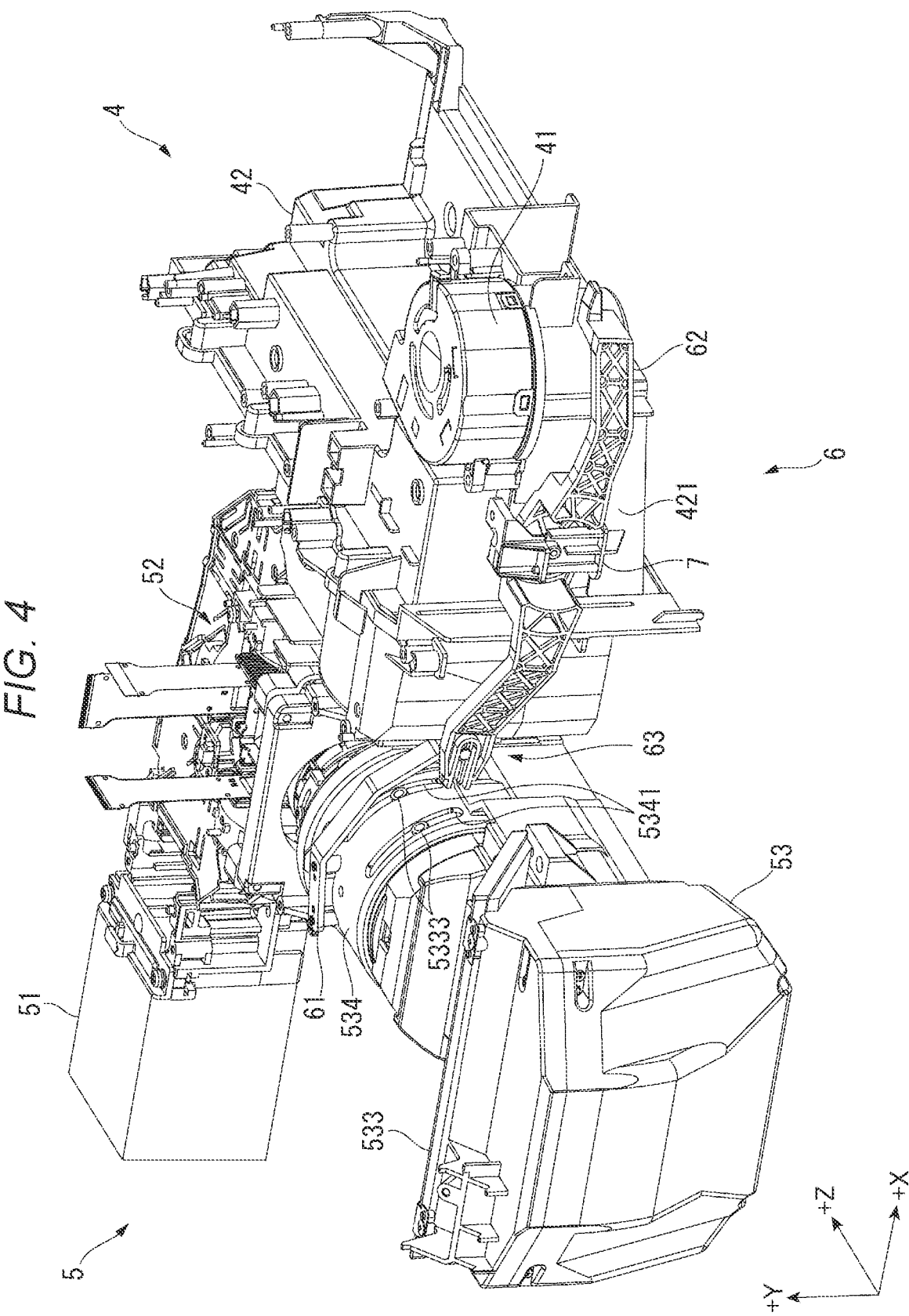
FIG. 4 is a perspective view of a cooler, an image projection section, and a position adjuster accommodated in the enclosure in the embodiment.

FIG. 4 is a perspective view of a cooler 4, an image projection section 5, and the position adjuster 6 accommodated in the enclosure 2 viewed from the side facing the front surface section 23.

The projector 1 includes the cooler 4, the image projection section 5, and the position adjuster 6 accommodated in the enclosure 2. In addition to the above, the projector 1 further includes, although not shown, a power supply that supplies electronic parts that form the projector 1 with electric power and the controller that controls the action of the projector 1 in the enclosure 2.

Configuration of Cooler

The cooler 4 cools a cooling target that forms the projector 1. The cooler 4 include a fan 41 and a base 42, on which the fan 41 is disposed.

The fan 41 sucks the cooling gas introduced into the interior of the enclosure 2 via the introduction port 262 and causes the sucked cooling gas to flow through the cooling target.

The base 42 is fixed in the interior of the enclosure 2. Although not shown in detail, the base 42 includes a duct through which the cooling gas discharged from the fan 41 flows. The base 42 includes a support 421 as a portion of the base 42 that is a portion facing the direction −Z, and the support 421 supports the operation member 62 of the position adjuster 6, which will be described later, in such a way that the operation member 62 is pivotable around a pivotal axis parallel to the direction +Z.

Configuration of Image Projection Section

The image projection section 5 forms an image according to image information inputted from the controller and projects the formed image on the projection receiving surface PS. The image projection section 5 includes a light source 51, a light modulator 52, and the projection section 53.

The light source 51 outputs light. The light modulator 52 modulates the light outputted from the light source 51 to form the image according to the image information.

The light source 51 and the light modulator 52 can be components used in a typical projector. No specific description of the light source 51 and the light modulator 52 is therefore made.

Configuration of Projection Section

Figure 5:
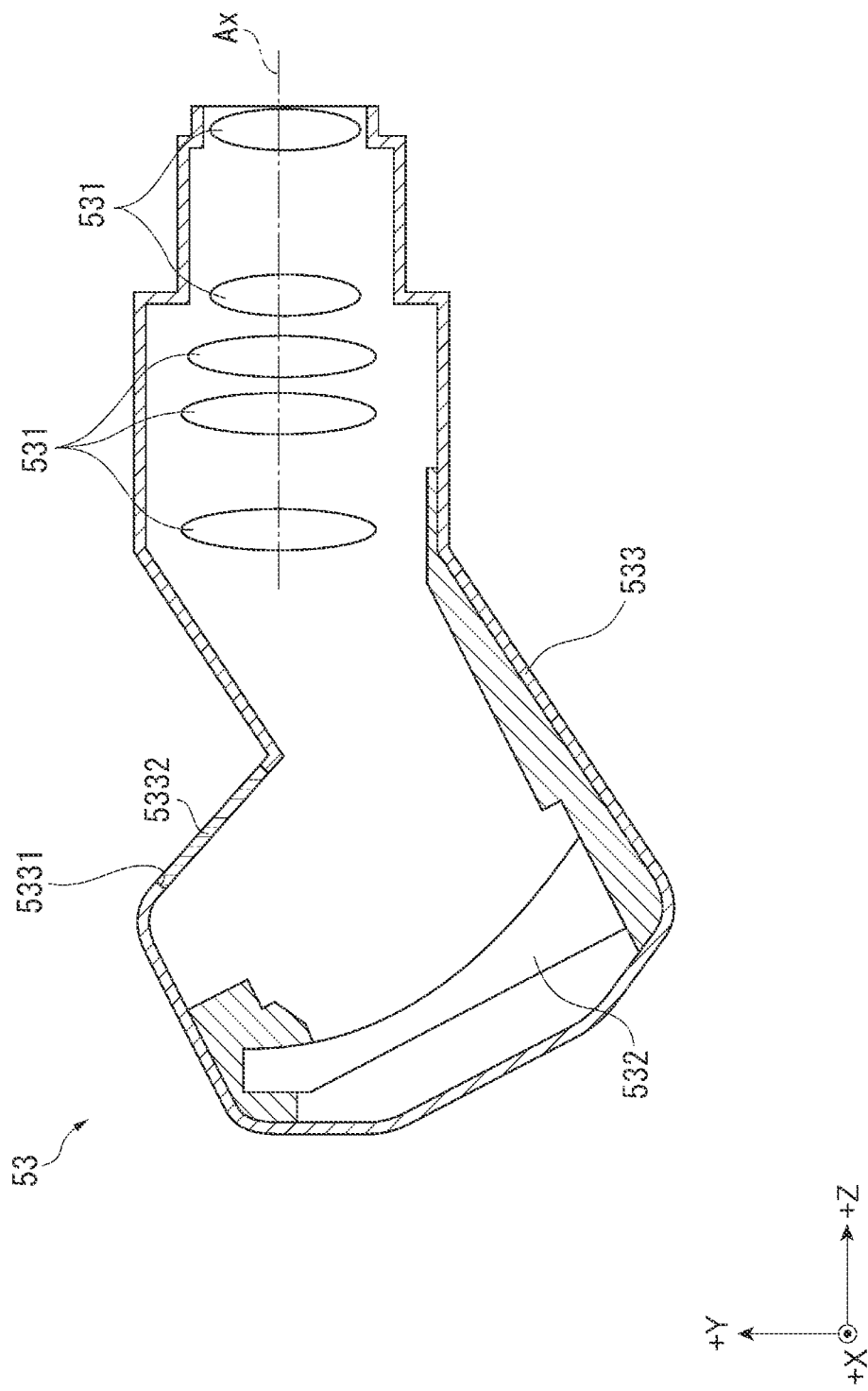
FIG. 5 is a cross-sectional view diagrammatically showing the interior configuration of a projection section in the embodiment.

FIG. 5 is a cross-sectional view diagrammatically showing the interior configuration of the projection section 53.

The projection section 53 projects the light modulated by the light modulator 52. That is, the projection section 53 projects the image formed by the light modulator 52. The projection section 53 includes a plurality of lenses 531 and a reflection mirror 532, as shown in FIG. 5, and further includes a holder 533 and a movable frame element 534, as shown in FIGS. 4 and 5.

The light modulated by the light modulator 52 enters the plurality of lenses 531. The plurality of lenses 531 output the light incident having passed therethrough to the reflection mirror 532. The plurality of lenses 531 include at least one of a focusing lens and a zooming lens. In the present embodiment, the plurality of lenses 531 include at least a focusing lens. The focusing lens is an adjustment target lens so configured that the position thereof on the optical axis Ax of the plurality of lenses 531 is adjusted by the position adjuster 6 and is also a movement target lens moved along the optical axis Ax. The movement target lens is hereinafter referred to as a target lens. The optical axis Ax is an axis parallel to the direction +Z when viewed along the direction +Y. The optical axis Ax is the lens optical axis of the plurality of lenses 531 and does not necessarily coincide with the center axis of the holder 533, which holds the plurality of lenses 531.

The reflection mirror 532 is an aspheric mirror that reflects the light incident via the plurality of lenses 531 and converts the incident light into wide-angle light. The reflection mirror 532 has a free-form reflection surface that is not rotationally symmetric. The reflection mirror 532 is so disposed on the direction −Z, which is the light exiting side of the plurality of lenses 531, with respect to the plurality of lenses 531 that the reflection surface faces the directions +Y and +Z. The reflection mirror 532 reflects the light guided along the direction −Z by the plurality of lenses 531 in such a way that the reflected light travels toward the directions +Y and +Z.

The holder 533 has a hollow shape and accommodates and holds the plurality of lenses 531 and the reflection mirror 532 therein. The opening 5331 is located in a surface of the holder 533 that is the surface facing the direction +Y, and the light reflected off the reflection mirror 532, that is, the image forming light passes through the opening 5331. The opening 5331 is closed by a light transmissive plate 5332, such as a glass plate.

The light having passed through the opening 5331 and the light transmissive plate 5332 passes the image opening 214 and is projected on the projection receiving surface PS. Employing the thus configured projection section 53 allows a wide-angle image to be displayed on the projection receiving surface PS even when the distance between the projection receiving surface PS and the projector 1 is short.

Figure 6:
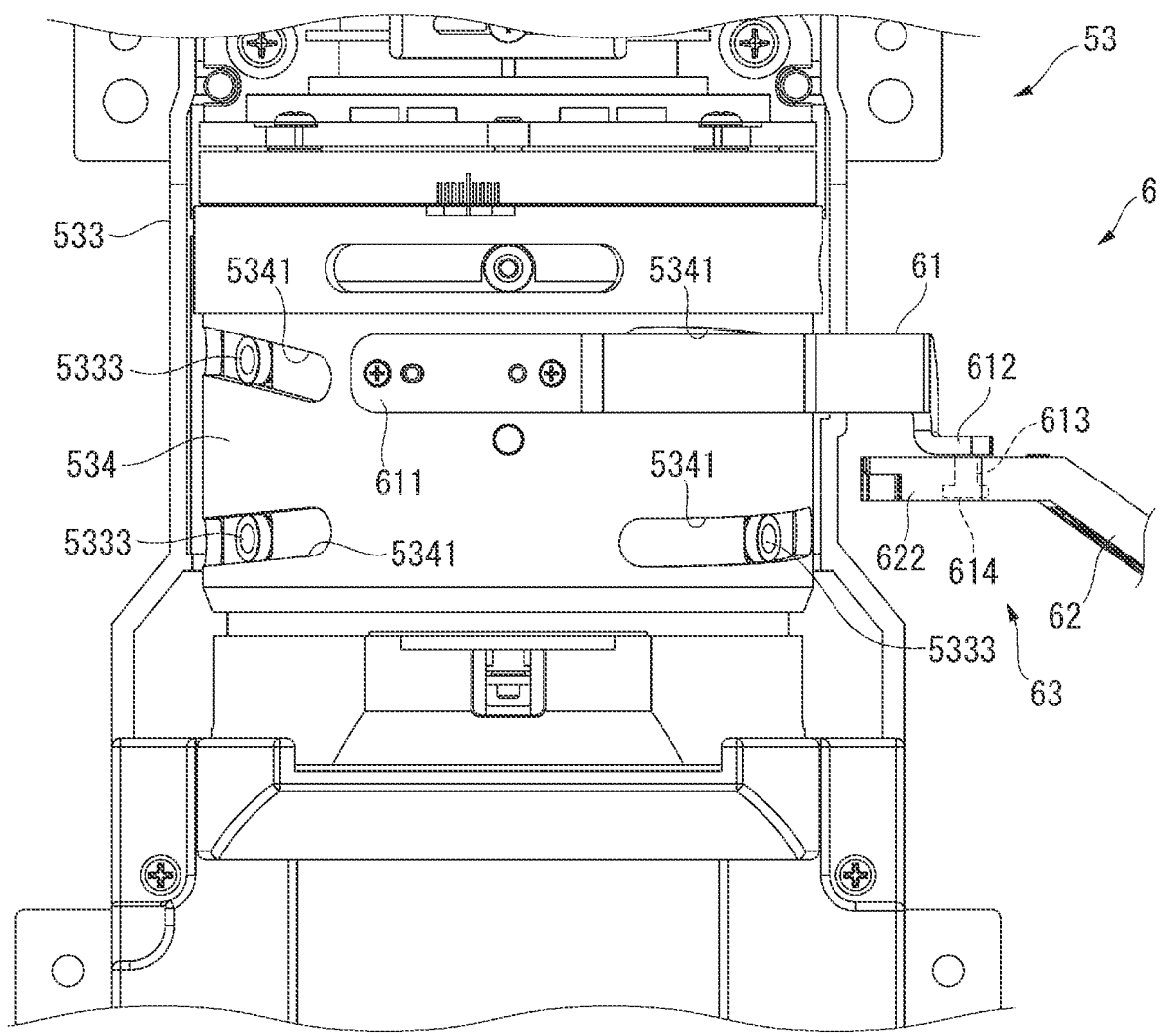
FIG. 6 is a plan view of the projection section and an arm member in the embodiment.
Figure 6:
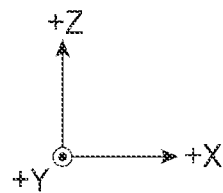

FIG. 6 is an enlarged plan view of part of the projection section 53 and part of an arm member 61 of the position adjuster 6 viewed along the direction +Y.

The holder 533 includes a plurality of guide pins 5333 on the outer circumferential surface of the holder 533, as shown in FIGS. 4 and 6. The plurality of guide pins 5333 are each inserted into a corresponding one of a plurality of guide hole 5341 provided in the movable frame element 534 and guide the pivotal motion of the movable frame element 534 along the outer circumference of the holder 533.

The movable frame element 534 is so formed as to have a cylindrical shape and so provided as to be pivotable around the optical axis Ax along the outer circumferential surface of the holder 533, as shown in FIG. 4. The arm member 61, which forms the position adjuster 6, which will be described is connected to the movable frame element 534. The movable frame element 534 pivots around the optical axis Ax when one end of the arm member 61 is moved in the directions ±Y, whereby a cam mechanism and other components none of which is shown move the target lens of the plurality of lenses 531 along the optical axis Ax.

The movable frame element 534 has the plurality of guide holes 5341, which extend along the circumference around the optical axis Ax, as shown in FIGS. 4 and 6. The plurality of guide pins 5333 are inserted into the plurality of corresponding guide pins 5341 and guide the pivotal motion of the movable frame element 534.

Configuration of Position Adjuster

Figure 7:
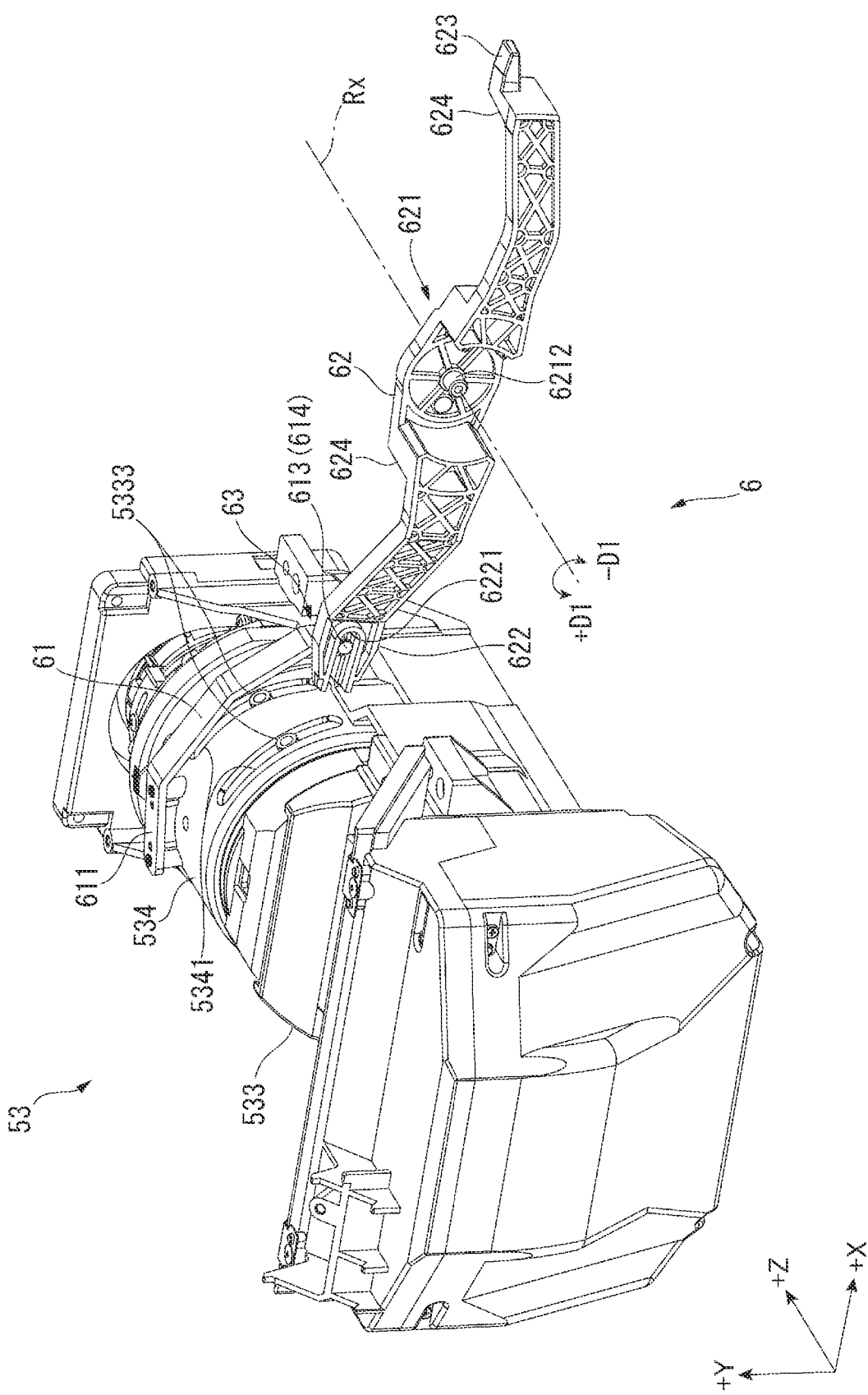
FIG. 7 is a perspective view showing the projection section and the position adjuster in the embodiment.

FIG. 7 is a perspective view showing the projection section 53 and the position adjuster 6.

The position adjuster 6, when operated by the user, adjusts the position of the target lens along the optical axis Ax. In the present embodiment, since the target lens is the focusing lens, it can be said that the position adjuster 6 is a focus adjuster that adjusts the focus state of a projected image.

The position adjuster 6 includes the arm member 61, the operation member 62, and a linkage mechanism 63, which links the arm member 61 to the operation member 62, as shown in FIGS. 4 and 7.

Configuration of Arm Member

The arm member 61 transmits the pivotal motion of the operation member 62 produced by the user to the movable frame element 534. The arm member 61 is a plate element elongated along the outer circumference of the movable frame element 534.

One end portion 611 of the arm member 61 that is the end portion facing the direction −X is fixed to the outer surface of the movable frame element 534 with a fixing member, such as screws. That is, the arm member 61 is integrated with the movable frame element 534.

Another end portion 612 of the arm member 61 that is the end portion facing the direction +X is located at one side of the holder 533 that is the side facing the direction +X.

The end portion 612 is so shaped as to overhang along the direction +X, which is perpendicular to the optical axis Ax, as shown in FIG. 6. A pin 613, which protrudes in parallel to the optical axis Ax, is provided at an end surface of the end portion 612 that is the end surface facing the direction −Z. That is, the arm member 61 has the pin 613 protruding in the direction −Z.

A bulged section 614, which has a cross-sectional area greater than that of the other portion of the pin 613, is provided at the front end of the pin 613.

The thus configured pin 613 is a portion that forms the linkage mechanism 63, is inserted into an elongated hole 6221 of the operation member 62, and slides along the elongated hole 6221.

Configuration of Operation Member

Figure 8:
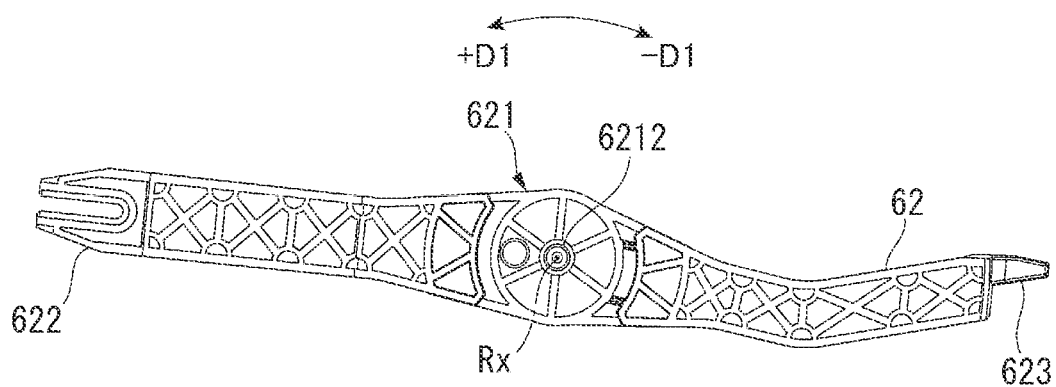
FIG. 8 shows an operation member in the embodiment.
Figure 8:
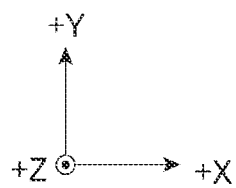
Figure 9:
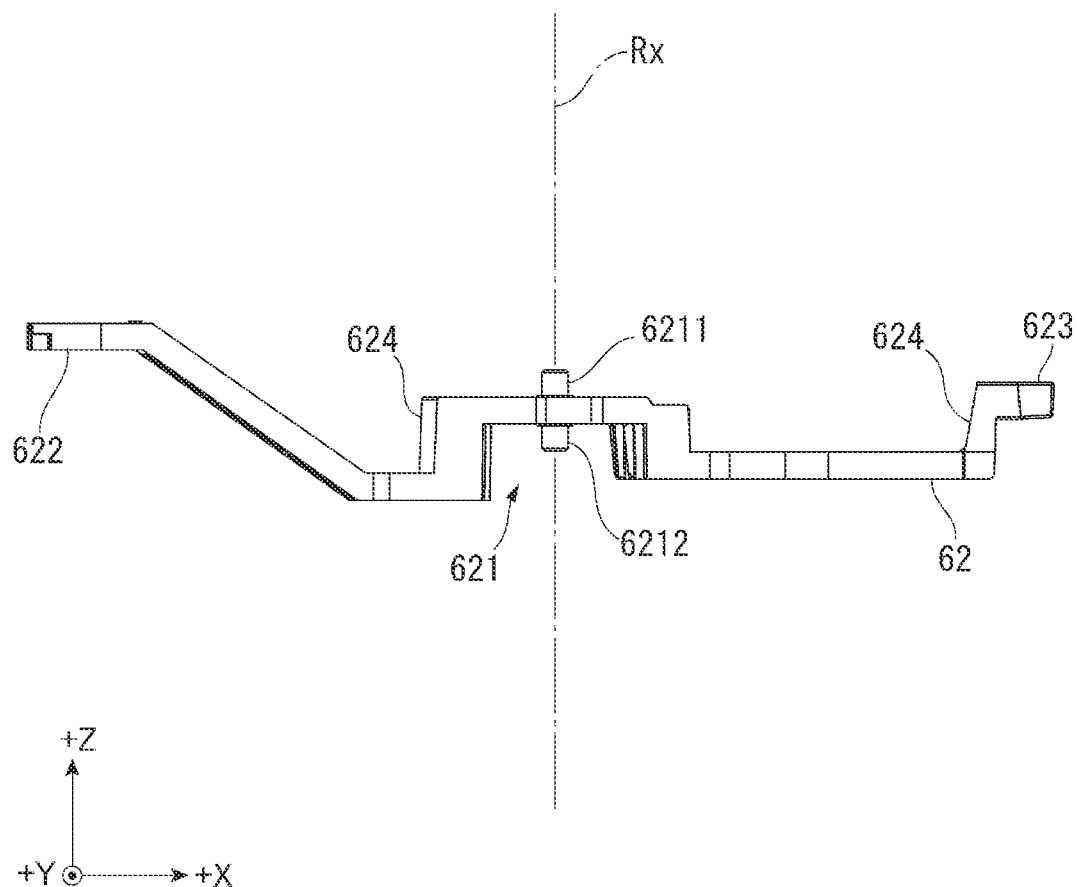
FIG. 9 shows the operation member in the embodiment.

FIG. 8 shows the operation member 62 viewed along the direction −Z, and FIG. 9 shows the operation member 62 viewed along the direction +Y.

The operation member 62, when operated by the user, causes the arm member 61 and the movable frame element 534 to pivot around the optical axis Ax and in turn moves the target lens along the optical axis Ax. The operation member 62 is so attached to the base 42 of the cooler 4, which is located on one side of the holder 533 that is the side facing the direction +X, as to be pivotable around the pivotal axis along the direction +Z, as shown in FIG. 4. That is, the operation member 62 is so pivotably provided in a position on one side of the holder 533 that is the side facing the direction +X.

The operation member 62 has a shape protruding along the direction +X, which intersects the optical axis Ax and the directions ±Y, as shown in FIGS. 7 to 9. The operation member 62 includes a pivotal axis section 621, a linkage section 622, the operation section 623, and two recesses 624.

The pivotal axis section 621 is a portion located substantially at the center of the operation member 62 and pivotably supported by the base 42. The pivotal axis section 621 has a boss 6211 (FIG. 9), which protrudes in the direction +Z, and a boss 6212 (FIG. 9), which protrudes in the direction −Z.

The boss 6211 is inserted into the base 42.

The boss 6212 is inserted into an attachment member 7 (see FIG. 4), which attaches the operation member 62 to the base 42.

The attachment member 7 is fixed to the base 42, whereby the operation member 62 is so attached to the base 42 as to be pivotable around a pivotal axis Rx along the direction +Z, as shown in FIG. 4.

The linkage section 622 is provided at an end portion of the operation member 62 that is the end portion facing the direction +X. The linkage section 622 is a portion that forms, along with the pin 613, the linkage mechanism 63 and links the arm member 61 to the operation member 62. The linkage section 622 has the elongated hole 6221, through which the pin 613 is inserted along the direction +Z.

The elongated hole 6221 passes through the linkage section 622 in the direction +Z. The direction in which the elongated hole 6221 extends in the direction along the direction +X when the operation member 62 is disposed along the direction +X, and the elongated hole 6221 is open in the direction −X. The pin 613 is inserted through the thus configured elongated hole 6221, whereby the arm member 61 and the operation member 62 are so linked to each other that the arm member 61 is pivotable relative to the operation member 62. That is, the linkage mechanism 63, which is formed of the pin 613 and the linkage section 622, links the arm member 61 to the operation member 62 and transmits the pivotal motion of the operation member 62 to the arm member 61 to cause the arm member 61 to pivot. When the operation member 62 is caused to pivot, the pin 613 moves along the edge of the elongated hole 6221.

The operation section 623 is provided at an end portion of the operation member 62 that is the end portion facing the direction +X. The operation section 623 is a portion exposed through the operation opening 265 out of the enclosure 2 and is also a portion of the operation member 62 that is the portion operated by the user. The operation section 623 is so tapered that the cross-sectional area thereof perpendicular to the direction +X decreases toward the direction −X.

The two recessed sections 624 are portions of the operation member 62 that are recessed in the direction −Z and are also portions for avoiding interference between the operation member 62 and parts located in the vicinity thereof. One of the two recessed sections 624 is provided between the pivotal axis section 621 and the linkage section 622, and the other recessed section 624 is provided between the pivotal axis section 621 and the operation section 623.

Configuration of Linkage Mechanism

The linkage mechanism 63 links the arm member 61 to the operation member 62 in such a way that they are pivotal relative to each other and causes the arm member 61 to pivot around the optical axis Ax in response to the pivotal motion of the operation member 62 around the pivotal axis Rx, as described above. The linkage mechanism 63 is formed of the pin 613, which is provided at the end portion 612 of the arm member 61, and the elongated hole 6221, which is formed in the linkage section 622 of the operation member 62.

Adjustment of Position of Target Lens Performed by Position Adjuster

Figure 10:
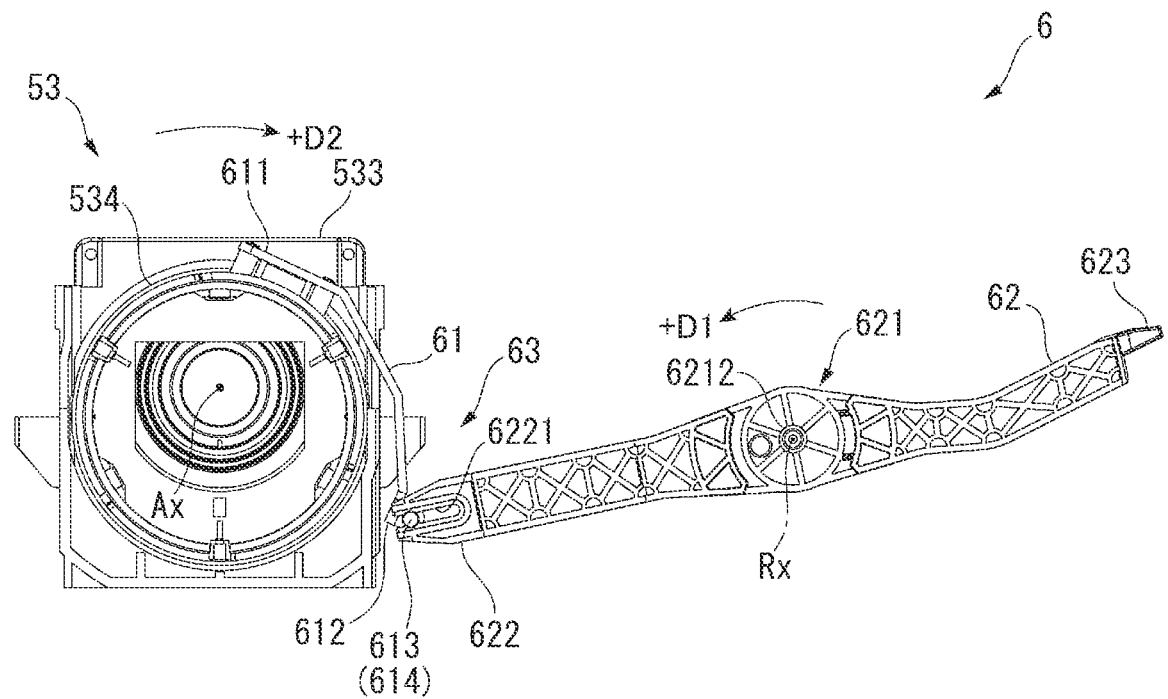
FIG. 10 describes the action of the position adjuster in the embodiment.
Figure 11:
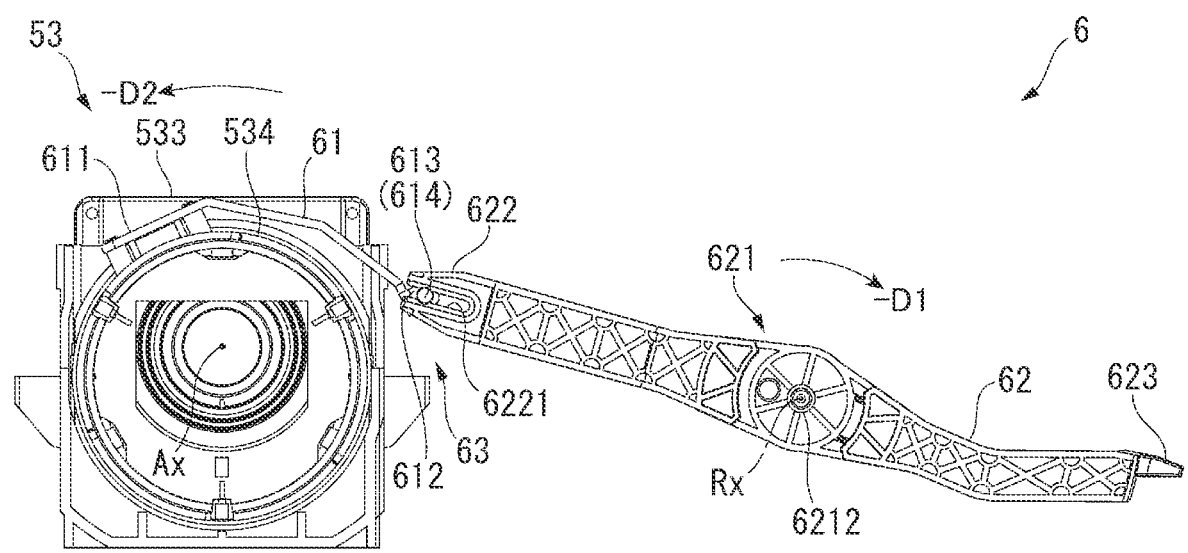
FIG. 11 describes the action of the position adjuster in the embodiment.
Figure 11:
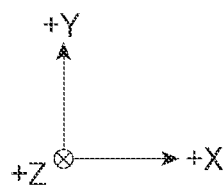

FIGS. 10 and 11 show the projection section 53 and the position adjuster 6 viewed along the direction −Z with the operation member 62 operated. In detail, FIG. 10 shows the projection section 53 and the position adjuster 6 with the operation section 623 moved in the direction +Y. FIG. 11 shows the projection section 53 and the position adjuster 6 with the operation section 623 moved in the direction −Y. FIGS. 10 and 11 show the cross section of the projection section 53 taken along the plane XY for ease of illustration of the state in which the arm member 61 is linked to the operation member 62.

When the operation section 623 is moved in the direction ±Y, the operation member 62 pivots around the pivotal axis Rx in directions ±D1, and the arm member 61 pivots around the optical axis Ax in directions ±D2, as shown in FIGS. 10 and 11.

Specifically, when the user moves the operation section 623 in the direction +Y, the operation member 62 pivots around the pivotal axis Rx in the direction +D1, as shown in FIG. 10. The arm member 61, which is fixed to the movable frame element 534, which is so provided around the holder 533 as to be pivotable around the optical axis Ax of the plurality of lenses 531, is linked to the operation member 62 via the linkage mechanism 63. Therefore, when the operation member 62 is caused to pivot in the direction +D1, an edge of the elongated hole 6221, which extends along the direction +X, that is the edge facing the direction +Y comes into contact with the pin 613 and moves the pin 613 in the direction −Y. The arm member 61 and the movable frame element 534 therefore pivot around the optical axis Ax in the direction +D2. That is, when the operation member 62 is caused to pivot around the pivotal axis Rx in the direction +D1, the arm member 61 and the movable frame element 534 pivot around the optical axis Ax in the direction opposite the direction in which the operation member 62 pivots.

When the movable frame element 534 is caused to pivot in the direction +D2 as described above, the position of the target lens along the optical axis Ax moves in one of the direction ±Z. The focus state of an image projected by the projection section 53 is thus adjusted in the present embodiment.

When the user moves the operation section 623 in the direction −Y, the operation member 62 pivots around the pivotal axis Rx in the direction −D1, which is opposite the direction +D1, as shown in FIG. 11. As described above, when the operation member 62 is caused to pivot in the direction −D1, an edge of the elongated hole 6221 that is the edge facing the direction −Y comes into contact with the pin 613 and moves the pin 613 in the direction +Y. As a result, the arm member 61 and the movable frame element 534 pivot around the optical axis Ax in the direction −D2, which is opposite the direction +D2. That is, when the operation member 62 is caused to pivot around the pivotal axis Rx in the direction −D1, the arm member 61 and the movable frame element 534 pivot around the optical axis Ax in the direction opposite the direction in which the operation member 62 pivots.

When the movable frame element 534 is caused to pivot in the direction −D2 as described above, the position of the target lens along the optical axis Ax moves in the other one of the directions ±Z. The focus state of an image projected by the projection section 53 is thus adjusted in the present embodiment.

Position of Pivotal Axis in Operation Member

Figure 12:
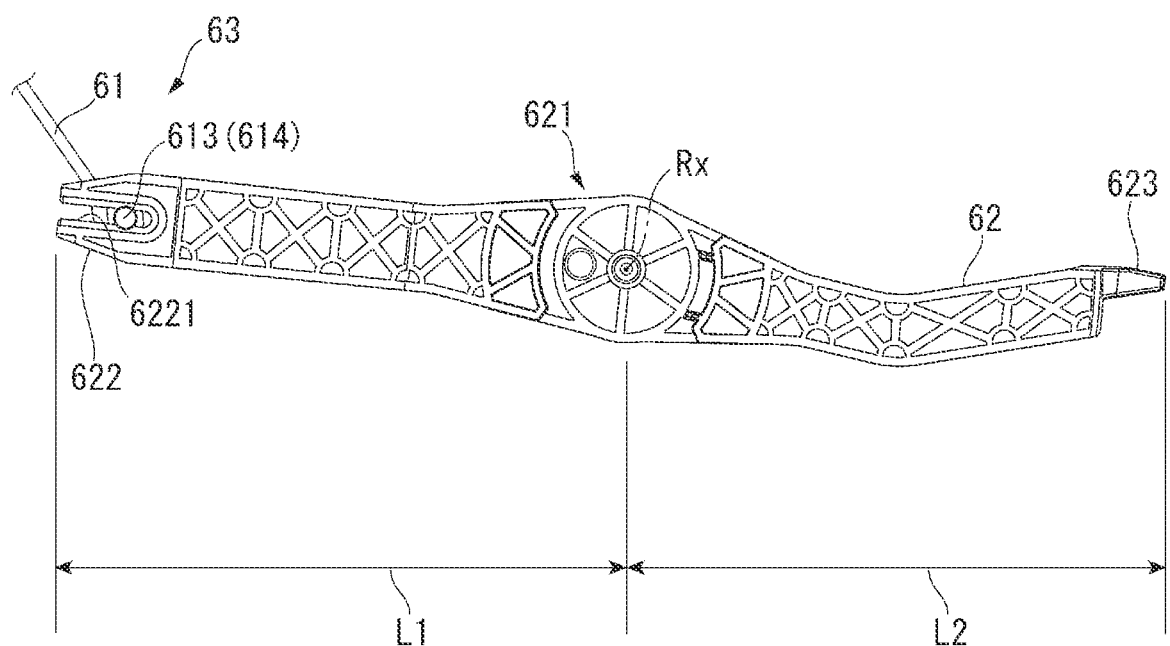
FIG. 12 describes the position of the pivotal axis of the operation member in the embodiment.

FIG. 12 shows the operation member 62 disposed along the direction +X and viewed along the direction −Z.

The pivotal axis Rx of the operation member 62 is set in a position closer to the operation section 623 than to the linkage section 622, as shown in FIG. 12. That is, the pivotal axis Rx of the operation member 62 is closer to the operation section 623, which is an end portion of the operation member 62 that is the end portion opposite the arm member 61, than to the linkage section 622, which is an end portion of the operation member 62 that is the end portion facing the arm member 61. In other words, a distance L1 between the pivotal axis Rx and the front end of the linkage section 622, which is an end portion of the operation member 62 that is the end portion facing the arm member 61, is greater than a distance L2 between the pivotal axis Rx and the front end of the operation section 623, which is an end portion of the operation member 62 that is the end portion opposite the arm member 61.

The angle of the pivotal motion of the operation member 62 can therefore be increased, and in turn the amount of movement of the linkage section 622 along the direction +Y can be increased as compared with an operation member having a pivotal axis Rx set at the center thereof in the direction +X even when the operation section 623 and the operation member for comparison are moved along the direction +Y by the same amount. The angle of pivotal motion of the arm member 61 and the movable frame element 534 can thus be increased, whereby the amount of movement of the target lens along the optical axis Ax can be increased. The target lens can therefore be moved by a large amount even when the movable range of the operation section 623 is small, so that the range of the pivotal motion of the operation member 62 can be set at a small value, whereby the size of the projector 1 can be reduced.

Figure 13:
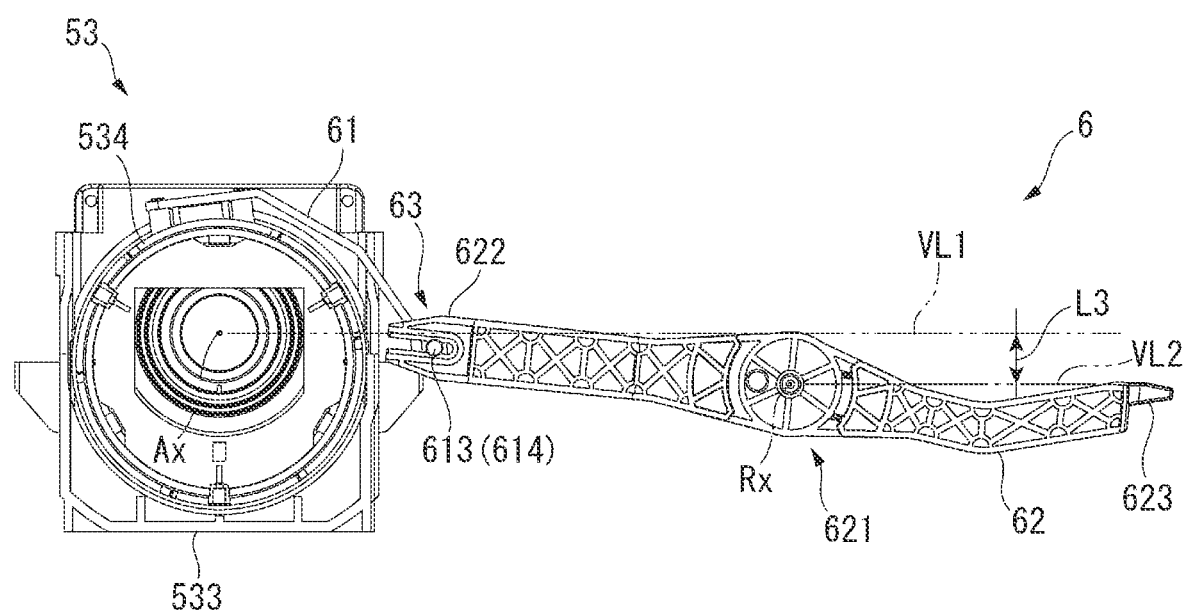
FIG. 13 shows the position of the optical axis of a plurality of lenses and the position of the pivotal axis of the operation member in the embodiment.
Figure 13:
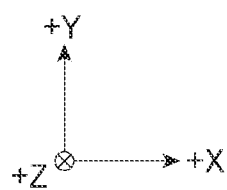

Difference in Position Between Optical Axis of Projection Section and Pivotal Axis of Operation Member FIG. 13 shows the position of the optical axis Ax of the plurality of lenses 531 and the position of the pivotal axis Rx of the operation member 62. In other words, FIG. 13 shows the projection section 53 and the position adjuster 6 viewed along the direction −Z. FIG. 13 shows the cross section of the projection section 53 taken along the plane XY, as FIGS. 10 and 11 do.

The pivotal axis Rx of the operation member 62 is so located as to be closer to the direction −Y than the optical axis Ax of the plurality of lenses 531, which form the projection section 53, as shown in FIG. 13. Specifically, when the projection section 53 and the operation member 62 are viewed along the direction −Z, an imaginary line VL1, which extends along the direction +X and is perpendicular to the optical axis Ax, and an imaginary line VL2, which extends along the direction +X and is perpendicular to the pivotal axis Rx, are separate by a distance L3 from each other, and the imaginary line VL2 is so located as to closer to the direction −Y than the imaginary line VL1. That is, the pivotal axis Rx is so located as to be closer to the bottom surface section 22 than the optical axis Ax.

The arm member 61 is made of a metal and has a relatively small thickness. Therefore, when the imaginary lines VL1 and VL2 coincide with each other, that is, when the position of the optical axis Ax and the position of the pivotal axis Rx in the direction +Y coincide with each other, the arm member 61 is likely to bend in the direction in which the force transmitted from the operation member 62 acts. In such cases, the arm member 61 only bends in accordance with the pivotal motion of the operation member 62, and the movable frame element 534, to which the arm member 61 is fixed, is unlikely to pivot around the optical axis Ax. In this case, the user's operation of moving the operation section 623 along the direction +Y is unlikely to correspond to the amount of movement of the target lens, resulting in a decrease in operability of the position adjuster 6.

In contrast, the pivotal axis Rx is so located as to be closer to the direction −Y than the optical axis Ax. Therefore, when the operation member 62 is caused to pivot in the direction +D1, as shown in FIG. 10, the edge of the elongated hole 6221 can move the pin 613 in the direction −Y while the arm member 61 is unlikely to bend. The arm member 61 and the movable frame element 534 are therefore readily allowed to pivot in the direction +D2.

Similarly, when the operation member 62 is caused to pivot in the direction −D1, as shown in FIG. 11, the edge of the elongated hole 6221 can move the pin 613 in the direction +Y while the arm member 61 is unlikely to bend. The arm member 61 and the movable frame element 534 are therefore readily allowed to pivot in the direction −D2.

The user's operation of moving the operation section 623 in the direction −Y can thus correspond to the amount of movement of the target lens, whereby the operability of the position adjuster 6 can be improved.

Effects of Embodiment

The projector 1 according to the present embodiment described above provides the following effects.

The projector 1 includes the projection section 53, which projects image forming light, the position adjuster 6, and the enclosure 2, which accommodates the projection section 53 and the position adjuster 6. The projection section 53 includes the plurality of lenses 531, the holder 533, which holds the plurality of lenses 531, and the movable frame element 534. The movable frame element 534 is so provided around the holder 533 as to be pivotable around the optical axis Ax of the plurality of lenses 531 and caused to pivot to move the movement target lens out of the plurality of lenses 531 along the optical axis Ax. The position adjuster 6 includes the arm member 61, the operation member 62, and the linkage mechanism 63. The arm member 61 is connected to the movable frame element 534 and caused to pivot along with the movable frame element 534. The operation member 62 is so provided in the enclosure 2 as to be pivotable around the pivotal axis Rx, which is substantially parallel to the optical axis Ax, and caused to pivot when an end portion of the operation member 62 that is the end portion opposite the arm member 61 is moved along the directions ±Y, which are perpendicular to the optical axis Ax. The linkage mechanism 63 links the arm member 61 to the operation member 62 and causes the arm member 61 to pivot in response to the pivotal motion of the operation member 62. The pivotal axis Rx of the operation member 62 is closer to the operation section 623, which is an end portion of the operation member 62 that is the end portion opposite the arm member 61, than to the linkage section 622, which is an end portion of the operation member 62 that is the end portion facing the arm member 61.

According to the configuration described above, the operation member 62, which causes the arm member 61 connected to the movable frame element 534 to pivot, is pivotably provided in the enclosure 2. The amount of play of the operation member 62 can therefore be suppressed as compared, for example, with a case where an operation member is entirely moved along an axial member provided along the direction +Y, whereby the position of the target lens can be readily adjusted. In addition to the above, the resistance that occurs when the operation member 62 is operated can be lowered, whereby the operability of the operation member 62 and in turn the operability of the position adjuster 6 can be improved.

The pivotal axis Rx is closer to the operation section 623 of the operation member 62 than to the linkage section 622 thereof. The amount of movement of the linkage section 622 linked to the arm member 61 can thus be greater than the amount of movement of the operation section 623. The angle of pivot motion of the operation member 62 necessary for the adjustment of the position of the target lens can be reduced as compared with a case where the pivotal axis Rx is closer to the linkage section 622 than to the operation section 623. An increase in the size of the projector 1 can therefore be suppressed.

The operation member 62 has a shape extending along the direction +X, which intersects the optical axis Ax and the direction +Y, which is perpendicular to the optical axis Ax.

According to the configuration described above, the size of the operation member 62 can be reduced as compared with a case where the operation member has an annular shape around the pivotal axis Rx. The increase in the size of the projector 1 resulting from the provision of the position adjuster 6 can therefore be suppressed.

The linkage mechanism 63 includes the pin 613, which is provided on one of the arm member 61 and the operation member 62, that is, the arm member 61, and protrudes in parallel to the optical axis Ax, and the elongated hole 6221, which is provided in the other member, that is, the operation member 62 along the direction +X, which intersects the optical axis Ax along the direction +Z and the direction +Y perpendicular to the optical axis Ax as described above, and through which the pin 613 passes. When the operation member 62 is caused to pivot, the pin 613 moves along the elongated hole 6221 to cause the arm member 61 to pivot.

According to the configuration described above, the linkage mechanism 63 can be formed of part of the arm member 61 and part of the operation member 62. The position adjuster 6 can therefore be simplified as compared with a case where the linkage mechanism 63 is provided as a member separate from the arm member 61 and the operation member 62. The projector 1 can therefore be simplified.

The enclosure 2 has the top surface section 21, which is the first surface section that intersects the direction +Y, and the image opening 214, which is located in the top surface section 21 and through which the light projected from the projection section 53 passes. The projection section 53 includes the reflection mirror 532, which reflects the light having exited out of the plurality of lenses 531 to project the light out of the enclosure 2 via the image opening 214.

Since the projection section 53 includes the reflection mirror 532, the projector 1 projects the light via the top surface section 21 on the projection receiving surface PS. In the thus configured projector 1, when the operation opening via which the operation section 623 is exposed is provided in the top surface section 21, the light projected by the projection section 53 could be disadvantageously blocked, for example, by the user's hand when the user adjusts the position of the target lens.

In contrast, the projector 1 includes the arm member 61 and the operation member 62, which are linked to each other via the linkage mechanism 63, as the configuration that rotates the movable frame element 534 to move the target lens. In the configuration described above, the operation opening 265 can be provided in the right side surface section 26, which is one of the surface sections of the enclosure 2 excluding the top surface section 21. The position of the target lens can therefore be adjusted without blockage of the light projected by the projection section 53, that is, an image.

The projector 1 includes the cover member 3 attached to the enclosure 2. The enclosure 2 includes the top surface section 21, the right side surface section 26, which is the second surface section that intersects the top surface section 21, and the operation opening 265, which is located in the right side surface section 26. The operation member 62 includes the operation section 623, which is located at a side of the operation member 62 that is the side opposite the arm member 61 and exposed via the operation opening 265. The cover member 3 is attached to the enclosure 2 and covers the operation opening 265 and the operation section 623.

According to the configuration described above, after the position of the target lens is adjusted, or when no adjustment of the position of the target lens is made, the projector 1 can be so set that the operation section 623 cannot be operated. Unnecessary operation of the operation section 623 can therefore be suppressed, whereby a change in the focus state of a projected image can be suppressed.

Further, since the operation opening 265 is located in the right side surface section 26, which intersects the top surface section 21, the situation in which the light projected by the projection section 53 is blocked, for example, by the user's hand that operates the operation section 623 exposed via the operation opening 265 can be effectively suppressed.

The enclosure 2 includes the introduction port 262, which is located in the right side surface section 26 and through which the air outside the enclosure 2 is introduced into the interior of the enclosure 2, and the filter 263, which is provided in the introduction port 262. The cover member 3 covers the introduction port 262 and the filter 263 as well as the operation opening 265 and the operation section 623.

According to the configuration described above, the cover member 3 can protect the operation member 62 and the filter 263. The single cover member 3 can be commonly used as a cover member that covers the operation member 62 and a cover member that covers the filter 263. An increase in the number of parts of the projector 1 can therefore be suppressed, whereby an increase in manufacturing cost of the projector 1 can be suppressed. In addition to the above, the number of boundary portions between the enclosure 2 and the cover member 3 decreases, whereby the exterior appearance of the projector 1 can be improved.

The projector 1 includes the operation buttons 264, which are provided in the right side surface section 26 and covered with the cover member 3.

According to the configuration described above, when the operation opening 265 is covered by the cover member 3, the operation buttons 264 are not exposed to the space outside the projector 1. Therefore, unnecessary operation of the operation buttons 264 can be suppressed, and the exterior appearance of the projector 1 can be improved.

Variations of Embodiment

The present disclosure is not limited to the embodiment described above, and variations, improvements, and other modifications to the extent that the advantage of the present disclosure is achieved fall within the scope of the present disclosure.

In the embodiment described above, the operation member 62 has a shape extending along the direction +X, but not necessarily. The operation member may have, for example, an annular or circular shape around the pivotal axis Rx. That is, the shape of the operation member is not limited to the shape described above.

In the embodiment described above, the position adjuster 6 adjusts the position of the focusing lens along the optical axis AX as the target lens out of the plurality of lenses 531 provided in the projection section 53. That is, the position adjuster 6 corresponds to the focus adjuster that adjusts the focus state of a projected image, but not necessarily. The target lens to be adjusted by the position adjuster 6 may be the zooming lens. In this case, the position adjuster 6 corresponds to a zooming adjuster that adjusts the zoom state of a projected image.

In the embodiment described above, the operation member 62 is pivotably supported by the base 42 of the cooler 4, but not necessarily. The operation member 62 only needs to be disposed in the enclosure 2 and may be pivotably supported by a component excluding the base 42. For example, the operation member 62 may be supported by a protrusion, such as a rib that stands in the enclosure 2, or may be supported by another component disposed in the enclosure 2.

In the embodiment described above, the linkage mechanism 63 is formed of the pin 613 of the arm member 61 and the elongated hole 6221 of the operation member 62, but not necessarily. A linkage member that links the arm member 61 to the operation member 62 in such a way that the arm member 61 is pivotable relative to the operation member 62 can be employed.

The arm member 61 is provided with the pin 613, and the operation member 62 has the elongated hole 6221, into which the pin 613 is inserted, but not necessarily. The operation member 62 may be provided with the pin, and the arm member may have the elongated hole into which the pin is inserted.

Further, the position where the arm member 61 is linked to the operation member 62 may not be located at an end portion of the operation member 62 that is the end portion facing the projection section 53 and may instead be located between the end portion facing the projection section 53 and the pivotal axis Rx.

In the embodiment described above, the enclosure 2 has the image opening 214 in the top surface section 21 as the first surface section. The projection section 53 includes the reflection mirror 532, which reflects the light having exited out of the plurality of lenses 531 and projects the light out of the enclosure 2 via the image opening 214, but not necessarily. The image opening may be provided in any of the surface sections of the enclosure 2 excluding the top surface section 21. Further, the projection section 53 may not include the reflection mirror 532. That is, the projection section 53 may project the light having exited out of the plurality of lenses 531 out of the enclosure directly via the image opening without use of the reflection mirror.

In the embodiment described above, the operation opening 265, via which the operation section 623 of the operation member 62 is exposed, is located in the right side surface section 26 out of the side surface sections of the enclosure 2 that intersect the top surface section 21, where the image opening 214 is located, but not necessarily. The operation opening may be located in any of the surface sections of the enclosure 2 excluding the right side surface section 26. For example, the Operation opening may be located in the left side surface section 25 or the top surface section 21.

In the embodiment described above, the projector 1 includes the cover member 3, which is attached to the enclosure 2 and covers the operation opening 265 and the operation section 623, but not necessarily. The projector 1 may not include the cover member 3. That is, the operation opening 265 and the operation section 623 may be always exposed to the space outside the projector 1.

In the embodiment described above, the cover member 3 covers the introduction port 262, the filter 263, and the operation buttons 264 as well as the operation opening 265 and the operation section 623, but not necessarily. The cover member 3 may only close the operation opening 265 and the operation section 623. Instead, the cover member 3 may cover the introduction port 262 and the filter 263 along with the operation opening 265 and the operation section 623 but may not cover the operation buttons 264. On the other hand, the cover member 3 may cover the operation buttons 264 along with the operation opening 265 and the operation section 623 but may not cover the introduction port 262 or the filter 263. In this case, the introduction port 262 and the filter 263 are provided in the right side surface section 26 or in any of the surface sections of the enclosure 2 excluding the right side surface section 26 and may be always exposed to the space outside the projector 1. The same holds true for the operation buttons 264.

Overview of Present Disclosure

An overview of the present disclosure will be added below.

A projector according to an aspect of the present disclosure includes a projection section that projects image forming light, a position adjuster, and an enclosure that accommodates the projection section and the position adjuster. The projection section includes a plurality of lenses, a holder that holds the plurality of lenses, and a movable frame element that is provided with the holder to be pivotable around the optical axis of the plurality of lenses and caused to pivot to move a movement target lens out of the plurality of lenses along the optical axis. The position adjuster includes an arm member connected to the movable frame element and caused to pivot along with the movable frame element, an operation member provided in the enclosure to be pivotable around a pivotal axis substantially parallel to the optical axis and caused to pivot when an end portion of the operation member that is the end portion opposite the arm member is moved along a direction perpendicular to the optical axis, and a linkage mechanism that links the arm member to the operation member and causes the arm member to pivot in response to the pivotal motion of the operation member. The pivotal axis of the operation member is closer to an end portion of the operation member that is an end portion opposite the arm member than to an end portion of the operation member that is the end portion facing the arm member.

According to the configuration described above, the operation member, which causes the arm member connected to the movable frame element to pivot, is pivotably provided in the enclosure. The amount of play of the operation member can therefore be suppressed as compared, for example, with the case where an operation member is entirely moved along an axial member provided along the movement direction described above, whereby the position of the movement target lens can be readily adjusted. In addition to the above, the resistance that occurs when the operation member is operated can be lowered, whereby the operability of the operation member and in turn the operability of the position adjuster can be improved.

The pivotal axis of the operation member is closer to an end portion of the operation member that is the end portion opposite the arm member than to an end portion of the operation member that is the end portion facing the arm member. The amount of movement of the end portion facing the arm member can thus be greater than the amount of movement of the end portion opposite the arm member. The angle of pivot motion of the operation member necessary for the adjustment of the position of the movement target lens can be reduced as compared with the case where the pivotal axis is closer to the end portion facing the arm member. An increase in the size of the projector resulting from the provision of the position adjuster can therefore be suppressed.

In the aspect described above, the operation member may have a shape extending along the direction that intersects the optical axis and the direction that is perpendicular to the optical axis.

According to the configuration described above, the size of the operation member can be reduced as compared with the case where the operation member has an annular shape around the pivotal axis. The increase in the size of the projector resulting from the provision of the position adjuster can therefore be suppressed.

In the aspect described above, the linkage mechanism may include a pin that is provided on one of the arm member and the operation member and protrudes in parallel to the optical axis and an elongated hole that is provided in the other one of the arm member and the operation member along a direction that intersects the optical axis and the direction perpendicular to the optical axis, and through which the pin passes. When the operation member is caused to pivot, the pin may move along the elongated hole to cause the arm member to pivot.

According to the configuration described above, the linkage mechanism can be formed of part of the arm member and part of the operation member. The position adjuster can therefore be simplified as compared with the case where the linkage mechanism is provided as a member separate from the arm member and the operation member. The projector can therefore be simplified.

In the aspect described above, the enclosure may have a first surface section that intersects the direction perpendicular to the optical axis and an image opening that is located in the first surface section and through which the light projected from the projection section passes. The projection section may include a reflection mirror that reflects the light having exited out of the plurality of lenses to project the light out of the enclosure via the image opening.

Since the projection section includes the reflection mirror, which reflects the light having exited out of the plurality of lenses, the projector projects the light via the first surface section, which is one of surface sections of the enclosure, in which the image opening is located, and which intersects the movement axis, on a projection receiving surface. In the thus configured projector, when the opening via which an end portion of the operation member that is the end portion opposite the arm member is exposed is provided in the first surface section, the light projected by the projection section could be disadvantageously blocked, for example, by the user's hand when the user adjusts the position of the movement target lens.

In contrast, the projector according to the aspect of the present disclosure includes the arm member and the operation member, which are linked to each other via the linkage mechanism, as the configuration that rotates the movable frame element to move the movement target lens. In the configuration described above, the opening via which an end portion of the operation member that is the end portion opposite the arm member is exposed can be provided in one of the surface sections of the enclosure excluding the first surface section. The position of the movement target lens can therefore be adjusted without blockage of the light projected by the projection section.

In the aspect described above, the projector may include a cover member attached to the enclosure. The enclosure may include a first surface section that intersects the direction perpendicular to the optical axis, a second side surface section that intersects the first surface section, and an operation opening that is located in the second side surface section. The operation member may include an operation section that is located at a side of the operation member that is the side opposite the arm member and exposed via the operation opening. The cover member may be attached to the enclosure and cover the operation opening and the operation section.

The cover member may be attachable and detachable to and from the enclosure. Instead, the cover member may be so provided as to be slidable or pivotable relative to the enclosure. The cover member may be caused to slide or pivot to one side to open the operation opening, whereas the cover member may be caused to slide or pivot to the other side to close the operation opening.

According to the configuration described above, after the position of the movement target lens is adjusted, or when no adjustment of the position is made, the projector can be so set that the operation member cannot be operated. Unnecessary operation of the operation member can therefore be suppressed, whereby, for example, a change in the focus or zoom state of a projected image can be suppressed.

In the aspect described above, the enclosure may include an introduction port that is located in the second side surface section and through which the air outside the enclosure is introduced into the interior of the enclosure and a filter that is provided in the introduction port, and the cover member may cover the introduction port and the filter.

According to the configuration described above, the cover member, which covers not only the operation opening but the introduction port and the filter, can protect the operation member and the filter. The single cover member can be commonly used as a cover member that covers the operation member and a cover member that covers the filter. An increase in the number of parts of the projector can therefore be suppressed, whereby an increase in manufacturing cost of the projector can be suppressed. In addition to the above, the number of boundary portions between the enclosure and the cover member decreases, whereby the exterior appearance of the projector can be improved.

In the aspect described above, the projector may include an operation button provided in the second side surface section and covered with the cover member.

According to the configuration described above, when the operation opening is covered by the cover member, the operation button is not exposed to the space outside the projector. Therefore, unnecessary operation of the operation button can be suppressed, and the exterior appearance of the projector can be improved.

What is claimed is:
1. A projector comprising:
a light projector that projects image forming light;
a position adjuster; and
an enclosure that accommodates the light projector and the position adjuster, wherein
the light projector includes
a plurality of lenses,
a holder that holds the plurality of lenses, and
a movable frame element provided with the holder to be pivotable around an optical axis of the plurality of lenses and caused to pivot to move a target lens out of the plurality of lenses along the optical axis,
the position adjuster includes
an arm member connected to the movable frame element and caused to pivot along with the movable frame element,
an operation member provided in the enclosure to be pivotable around a pivotal axis substantially parallel to the optical axis, extended in a longitudinal direction intersecting the optical axis and caused to pivot when an end portion of the operation member that is an end portion opposite the arm member is moved, and
a linkage mechanism that links the arm member to the operation member and causes the arm member to pivot in response to the pivotal motion of the operation member, and
the pivotal axis of the operation member is closer to an end portion of the operation member that is the end portion opposite the arm member than to an end portion of the operation member that is an end portion facing the arm member.

2. The projector according to claim 1, wherein the linkage mechanism includes
a pin that is provided at one of the arm member and the operation member and protrudes in parallel to the optical axis, and an elongated hole which is provided in the other one of the arm member and the operation member along a direction perpendicular to the optical axis and through which the pin passes, and when the operation member is caused to pivot, the pin moves along the elongated hole to cause the arm member to pivot.

3. The projector according to claim 1, wherein a direction from one side surface of the enclosure toward another side surface of the enclosure is a direction X, and a first imaginary line that extends along the direction X and is perpendicular to the optical axis of the plurality of lenses and a second imaginary line that extends along the direction X and is perpendicular to the pivotal axis of the operation member are separate from each other.

4. The projector according to claim 1, further comprising a base to which a pivotal axis section of the operation member is attached, wherein the operation member has a recessed section that is provided between the pivotal axis section of the operation member and an end portion of the operation member and avoids interference between the operation member and part of the base.

5. The projector according to claim 1, wherein the enclosure has a first surface section that intersects the direction perpendicular to the optical axis, and an image opening which is located in the first surface section and through which the light projected from the light projector passes, and the projection section includes a reflection mirror that reflects light that exits out of the plurality of lenses to project the light out of the enclosure via the image opening.

6. The projector according to claim 1, further comprising a cover member attached to the enclosure, wherein the enclosure includes a first surface section that intersects the direction perpendicular to the optical axis, a second surface section that intersects the first surface section, and an operation opening that is located in the second side surface section, the operation member includes an operation section located at a side of the operation member that is a side opposite the arm member and exposed via the operation opening, and the cover member is attached to the enclosure and covers the operation opening and the operation section.

7. The projector according to claim 6, wherein the enclosure includes an introduction port which is located in the second side surface section and through which air outside the enclosure is introduced into an interior of the enclosure, and a filter provided in the introduction port, and the cover member covers the introduction port and the fitter.

8. The projector according to claim 6, further comprising an operation button provided in the second side surface section and covered with the cover member.

\* \* \* \* \*